United States Patent
Hu et al.

(10) Patent No.: US 12,322,207 B2
(45) Date of Patent: Jun. 3, 2025

(54) METHOD AND DEVICE FOR IDENTIFYING UNSAFE BEHAVIOR OF DRILLING OPERATOR

(71) Applicant: China University of Petroleum-Beijing, Beijing (CN)

(72) Inventors: Jinqiu Hu, Beijing (CN); Chuangang Chen, Beijing (CN); Yiyue Chen, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 366 days.

(21) Appl. No.: 17/833,461

(22) Filed: Jun. 6, 2022

(65) Prior Publication Data
US 2023/0290182 A1    Sep. 14, 2023

(30) Foreign Application Priority Data
Mar. 8, 2022 (CN) .......................... 202210228092.3

(51) Int. Cl.
| | | |
|---|---|---|
| *G06V 40/19* | (2022.01) | |
| *G06V 10/774* | (2022.01) | |
| *G06V 40/20* | (2022.01) | |
| *G08B 21/02* | (2006.01) | |

(52) U.S. Cl.
CPC ............ *G06V 40/19* (2022.01); *G06V 10/774* (2022.01); *G06V 40/20* (2022.01); *G08B 21/02* (2013.01)

(58) Field of Classification Search
CPC ...... G06V 40/19; G06V 10/774; G06V 40/20; G08B 21/02
See application file for complete search history.

(56) References Cited

U.S. PATENT DOCUMENTS

| | | | | |
|---|---|---|---|---|
| 6,092,058 A | * | 7/2000 | Smyth | A61B 5/378 706/15 |
| 8,824,779 B1 | * | 9/2014 | Smyth | G06T 7/73 382/117 |
| 9,779,299 B2 | * | 10/2017 | Strombom | G06V 40/19 |
| 9,940,518 B1 | * | 4/2018 | Klingström | G06V 40/193 |
| 10,019,634 B2 | * | 7/2018 | Vaziri | H04N 23/11 |

(Continued)

*Primary Examiner* — John Villecco
*Assistant Examiner* — Alexander John Rodgers
(74) *Attorney, Agent, or Firm* — Pokalsky Wilczynski Brozek, LLP (57) ABSTRACT

The embodiments of the present application provide a method and a device for identifying an unsafe behavior of a drilling operator, which relate to the field of data analysis, and the method includes obtaining eye movement data information of a drilling operator by an eye movement data sensor, processing the eye movement data information to obtain an eye movement characteristic parameter corresponding to the eye movement data information, inputting the eye movement characteristic parameter to an identification model to obtain an output result from the identification model, and determining an operation behavior of the operator according to the output result and sending a warning to the operator when the operation behavior is a preset type. Through analyzing the eye movement data information in real time, whether an operation behavior meets regulations can be determined, thus realizing real-time monitoring and identification of unsafe operation behaviors of the drilling operator.

15 Claims, 6 Drawing Sheets

(56) References Cited

U.S. PATENT DOCUMENTS

| | | | |
|---|---|---|---|
| 10,303,247 B2* | 5/2019 | Xu | G06V 40/19 |
| 10,342,473 B1* | 7/2019 | Berme | A61B 5/1036 |
| 11,337,606 B1* | 5/2022 | Berme | G02B 27/0093 |
| 11,675,430 B1* | 6/2023 | Peuhkurinen | G06F 3/14 |
| | | | 345/156 |
| 2005/0073136 A1* | 4/2005 | Larsson | A61B 5/11 |
| | | | 180/272 |
| 2010/0027890 A1* | 2/2010 | Yoshinaga | G06V 40/193 |
| | | | 382/195 |
| 2010/0033333 A1* | 2/2010 | Victor | A61B 5/7264 |
| | | | 340/576 |
| 2013/0058529 A1* | 3/2013 | Levin | A61B 5/163 |
| | | | 382/103 |
| 2013/0188834 A1* | 7/2013 | Ebisawa | G06T 7/70 |
| | | | 382/103 |
| 2013/0329957 A1* | 12/2013 | Ebisawa | G06F 3/013 |
| | | | 382/103 |
| 2015/0339527 A1* | 11/2015 | Plummer | G06V 40/18 |
| | | | 348/78 |
| 2016/0063085 A1* | 3/2016 | De Kock | G06F 3/0484 |
| | | | 707/737 |
| 2016/0110621 A1* | 4/2016 | Tsimhoni | G06V 40/193 |
| | | | 382/104 |
| 2016/0116977 A1* | 4/2016 | Goldman-Shenhar | |
| | | | B60K 37/00 |
| | | | 345/156 |
| 2017/0172675 A1* | 6/2017 | Jarc | A61B 90/361 |
| 2017/0286771 A1* | 10/2017 | Ishii | A61B 3/113 |
| 2017/0291613 A1* | 10/2017 | George-Svahn | B60K 28/02 |
| 2017/0344110 A1* | 11/2017 | Yoshioka | G06V 40/193 |
| 2017/0351329 A1* | 12/2017 | Picard | G06V 10/44 |
| 2017/0364147 A1* | 12/2017 | Canella | G06F 16/22 |
| 2018/0232575 A1* | 8/2018 | Strombom | A61B 3/113 |
| 2018/0330177 A1* | 11/2018 | Ryu | B62D 15/021 |
| 2018/0341327 A1* | 11/2018 | Wuergler | F16H 61/18 |
| 2019/0033965 A1* | 1/2019 | Raghunath | G06F 3/013 |
| 2019/0138790 A1* | 5/2019 | Matsumura | G06V 40/103 |
| 2019/0250707 A1* | 8/2019 | Kondo | G02B 27/0093 |
| 2020/0125166 A1* | 4/2020 | Ortiz Egea | G06F 3/013 |
| 2020/0183155 A1* | 6/2020 | Xie | G02B 26/0875 |
| 2020/0183490 A1* | 6/2020 | Klingström | G06T 7/73 |
| 2020/0202562 A1* | 6/2020 | Guo | G06T 7/246 |
| 2020/0380728 A1* | 12/2020 | Alonso | G06T 7/80 |
| 2021/0004618 A1* | 1/2021 | Qin | G06N 3/045 |
| 2021/0004619 A1* | 1/2021 | Qin | G06V 40/107 |
| 2021/0034845 A1* | 2/2021 | Lu | G06V 20/52 |
| 2021/0082371 A1* | 3/2021 | Novelli | G09G 5/10 |
| 2021/0089120 A1* | 3/2021 | Grimm | G06T 7/73 |
| 2021/0347364 A1* | 11/2021 | Ratcliff | B60W 50/16 |
| 2022/0067411 A1* | 3/2022 | Jumonji | A61B 5/0077 |
| 2023/0036233 A1* | 2/2023 | Shimizu | B60K 35/10 |
| 2023/0096284 A1* | 3/2023 | Whinnery | G06F 3/012 |
| | | | 701/301 |
| 2023/0116638 A1* | 4/2023 | Martínez | G06T 7/277 |
| | | | 382/103 |
| 2024/0143077 A1* | 5/2024 | Prasad | G06F 3/013 |

* cited by examiner

METHOD AND DEVICE FOR IDENTIFYING UNSAFE BEHAVIOR OF DRILLING OPERATOR

CROSS-REFERENCE TO RELATED APPLICATION

This application claims priority to Chinese Patent Application No. 202210228092.3, filed on Mar. 8, 2022, which is hereby incorporated by reference in its entirety.

TECHNICAL FIELD

The present application relates to the field of data analysis and, in particular, to a method and a device for identifying an unsafe behavior of a drilling operator.

BACKGROUND

Drilling operation is one of high-risk fields in the industry of petroleum and natural gas, and researches find that more than 80% of drilling operation accidents are related to people's unsafe behaviors. Therefore, realizing the identification of the unsafe behaviors of drilling operators is the key to reducing the occurrence of drilling operation accidents.

Currently, for the researches on the identification method of unsafe behaviors of drilling operators, solutions used are mainly divided into two categories, the first one is adopting the method of manual inspection or post-event investigation and analysis, the second one is adopting video monitoring to collect unsafe behaviors of operators and then identifying the same using artificial intellectual algorithms.

However, both of the above two technical solutions can not realize the whole-course real-time monitoring and identification of unsafe behaviors of drilling operators.

SUMMARY

The present application provides a method and a device for identifying an unsafe behavior of a drilling operator. The eye movement data of the drilling operator is collected in real time by an eye movement data sensor worn by the drilling operator, and the eye movement data is analyzed to determine if an operation behavior of the drilling operator is normal. This realizes real-time monitoring and identification of unsafe operation behaviors of drilling operators.

According to a first aspect, the present application provides a method for identifying an unsafe behavior of a drilling operator, including:

obtaining, by an eye movement data sensor, eye movement data information on the operator gazing at every area in a drilling operation scenario, where the operation scenario includes a plurality of sensitive areas and non-sensitive areas;

processing the eye movement data information to obtain an eye movement characteristic parameter corresponding to the eye movement data information, and the eye movement characteristic parameter includes a sensitive-area gaze-point parameter, a sensitive-area gaze time-length parameter, a time parameter for the first gaze to sensitive areas, a time parameter for the second gaze to sensitive areas, and an average gaze time-length parameter.

inputting the eye movement characteristic parameter to an identification model to obtain an output result from the identification model;

determining an operation behavior of the operator according to the output result, and sending a warning to the operator when the operation behavior is a preset type.

Optionally, the eye movement data information includes: total number of gaze points, data collection time for single-time eye movement, average gaze time-length, time for the first gaze to one of the sensitive areas, time for the second gaze to one of the sensitive areas, number of gaze points in the sensitive areas, and time-length for gazing at the sensitive areas.

Optionally, the processing the eye movement data information to obtain the eye movement characteristic parameter corresponding to the eye movement data information includes:

obtaining the sensitive-area gaze-point parameter according to a ratio of a sum of the number of gaze points in each of the sensitive areas in the operation scenario to a total number of gaze points in the operation scenario;

obtaining the sensitive-area gaze time-length parameter according to a ratio of a sum of time-length for gazing at each of the sensitive areas in the operation scenario to data collection time for single-time eye movement;

obtaining the time parameter for the first gaze to sensitive areas according to a ratio of the minimum value among time values for the first gaze to each of the sensitive areas in the operation scenario to the data collection time for single-time eye movement;

obtaining the time parameter for the second gaze to sensitive areas according to a ratio of the minimum value among time values for the second gaze to each of the sensitive areas in the operation scenario to the data collection time for single-time eye movement;

determining the average gaze time-length parameter according to a ratio of a sum of time-length for gazing at each of N gaze points in the operation scenario to N times of the data collection time for single-time eye movement.

Optionally, the inputting the eye movement characteristic parameter to the identification model to obtain the output result from the identification model includes: inputting the eye movement characteristic parameter to the identification model to obtain a plurality of type values, where the identification model comprises a plurality of sub-type models, and each of the sub-type models outputs one type value; and the determining the operation behavior of the operator according to the output result includes: determining the operation behavior of the operator according to the plurality of type values.

Optionally, the determining the operation behavior of the operator according to the plurality of type values includes:

obtaining the maximum value among the plurality of type values, where the type values are in a range of 0 to 1; and determining a type corresponding to the maximum type value as the operation behavior of the operator.

Optionally, the method for identifying the unsafe behavior of the drilling operator further includes:

obtaining different types of training data; when the training data corresponds to a first sub-type model, a tag value for the first sub-type model is 1, and tag values for other second sub-type models are 0; and training the plurality of sub-type models in the identification model to obtain a trained identification model.

Optionally, the operation behavior is one of a normal behavior, an illegal behavior, a faulty behavior, a behavior with potential safety hazard.

According to a second aspect, the present application provides a device for identifying an unsafe behavior of a drilling operator, including:

a memory, a processor connected to the memory, and a computer program stored on the memory and runnable on the processor, wherein the computer program, when executed by the processor, causes the processor to:

collect eye movement data information of the drilling operator in an operation scenario.

screen and process the eye movement data information of the operator to obtain an eye movement characteristic parameter;

analyze the eye movement characteristic parameter to obtain an analysis result;

determine an operation behavior of the operator according to the analysis result, and send a warning to the operator when the operation behavior is a preset type.

According to a third aspect, an embodiment of the present application provides a computer readable storage medium with a computer program stored therein. The computer program is executed by a processor to implement the method according to any one of the first aspect.

According to a fourth aspect, an embodiment of the present application provides a computer program product including a computer program, and the computer program is executed by a processor to implement the method according to any one of the first aspect.

The present application provides a method and a device for identifying an unsafe behavior of a drilling operator. Eye movement data information may be collected by an eye movement data sensor worn by the operator, and the eye movement data information is processed to obtain an eye movement characteristic parameter corresponding to the eye movement data information. The eye movement characteristic parameter is input to an identification model to obtain a plurality of type values output by the identification model, and an operation behavior is determined according to the maximum type value. When the operation behavior is one of abnormal behaviors, a warning is sent to the operator. By analyzing the eye movement data information of the drilling operator in real time, whether the operation behavior of the drilling operator meets regulations is determined, thus realizing the real-time monitoring and identification of an unsafe operation behavior of a drilling operator.

DESCRIPTION OF EMBODIMENTS

In order to clearly describe the technical solutions in embodiments of the present application, some terms and techniques involved in the embodiments of the present application are briefly described below.

1) The gaze tracking technology is the one used for recording information such as a gaze position, a glance path, and gaze time-length of the eyes of a participant by using an eye movement data sensor to know the concentration condition of the participant. The gaze tracking technology not only can realize real-time monitoring and identification of unsafe behaviors of operators, but also performs good identification on wrong actions that have not yet started and behaviors with potential safety hazard due to operators themselves.

2) Sensitive areas refer to areas where important equipment units are located during the drilling operation, and usually include areas where instruments, valves, drill bits, equipment operation tables, and the like of the drilling equipment are located.

3) Other Terms

In the embodiments of the present application, words such as "first" and "second" are used to distinguish same items or similar items having substantially the same function and effect, not defining a sequence thereof. Persons of ordinary skill in the art is able to understand the words such as "first" and "second", and do not define the number and execution order, and the words such as "first" and "second" do not define a definite difference.

It should be noted that, in the embodiments of the present application, words such as "exemplarily" or "for example" are used to represent examples, illustrations, or explanations. Any embodiment or technical solution described with "exemplarily" or "for example" in the present application should not be construed as being more preferred or advantageous than other embodiments or technical solutions. In fact, the words such as "exemplarily" or "for example" are intended to present relevant concepts in a specific manner.

The methods according to the embodiments of the present application are described in detail below with reference to the accompanying drawings. It should be noted that the term "when" in the embodiments of the present application may be a moment when a certain situation occurs, or may be within a period of time after the certain situation occurs, which is not specifically limited in the embodiments of the present application.

The drilling operation is one of the high-risk fields in the industry of petroleum and natural gas, and researches find that more than 80% of drilling operation accidents are related to people's unsafe behaviors. Therefore, realizing the identification of unsafe behaviors of drilling operators is the key to reducing the occurrence of drilling operation accidents.

Currently, for the researches on the methods for identifying unsafe behaviors of drilling operators, solutions used are mainly divided into two categories: the first one is adopting the method of manual inspection or post-event investigation and analysis, the second one is adopting video monitoring to collect unsafe behaviors of operators and then identifying the same using artificial intellectual algorithms.

However, neither of the above two technical solutions can realize real-time monitoring and identification of drilling operators, especially in monitoring dead corners or when inspection is not conducted timely.

In view of the above, the present application provides a method and a device for identifying an unsafe behavior of a drilling operator based on eye movement data. This is aiming at realizing monitoring and identification of unsafe behaviors of drilling operators with the combination of an eye movement data sensor having the ability of real-time capture of human eye movement data, the ability of being wearable, and the advantage of data classification using ensemble learning method.

The technical solutions of the present application and how the technical solutions of the present application solve the above-mentioned technical problems are described in detail below with specific embodiments. The following specific embodiments may be combined with each other, and the same or similar concepts or processes may not be repeated in some embodiments. Embodiments of the present application will be described below with reference to the accompanying drawings.

Figure 1:
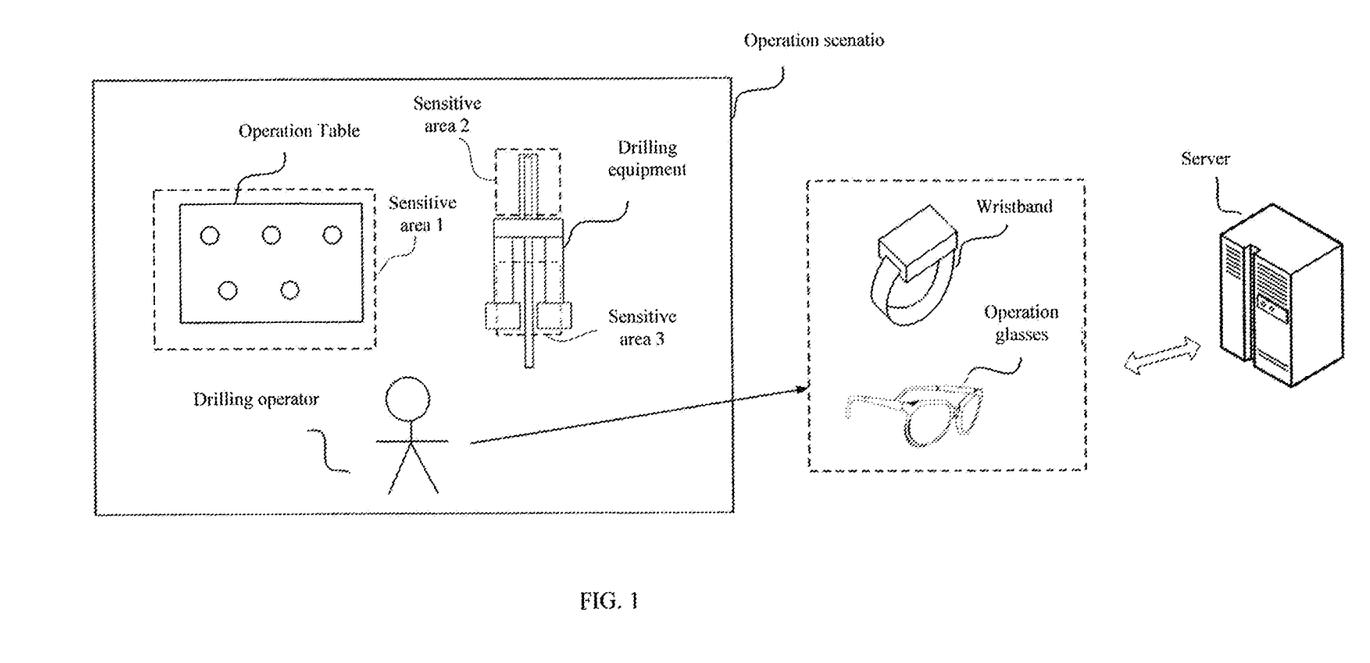
FIG. 1 is a schematic diagram of a scenario according to an embodiment of the present application.

FIG. 1 is a schematic diagram of a scenario according to an embodiment of the present application, as shown in FIG. 1, including an operation table, drilling equipment, a drilling operator, a server, and operation glasses and a wristband worn by the drilling operator during operation.

The operation glasses and the wristband can interact with the server.

During operation, the drilling operator needs to wear the operation glasses and the wristband. The operation glasses are provided with an eye movement data sensor for collecting eye movement data of the operator. The wristband can receive reminding messages sent by the server, and is used for reminding the drilling operator when an unsafe behavior occurs.

The drilling operator needs to focus on the operation table and the drilling equipment during operation, therefore the sight of who needs to be switched back and forth between the operation table and the drilling equipment. Whether the drilling operator focuses on the operation table and the drilling equipment or not can be determined by analyzing the eye movement data of the drilling operator, thereby determining whether the operator has an unsafe behavior or not.

It can be understood that the operation glasses and the wristband can be other wearable devices, for example, the operation glasses can also be a helmet, a hat, goggles and the like, which can implement the functions of collecting eye movement data and receiving reminders in the embodiments of the present application. The embodiments of the present application are not limited thereto.

The implementation scenario in the embodiments of the present application is described above, and the following describes in detail how to identify an unsafe behavior of a drilling operator according to the embodiments of the present application.

Figure 2:
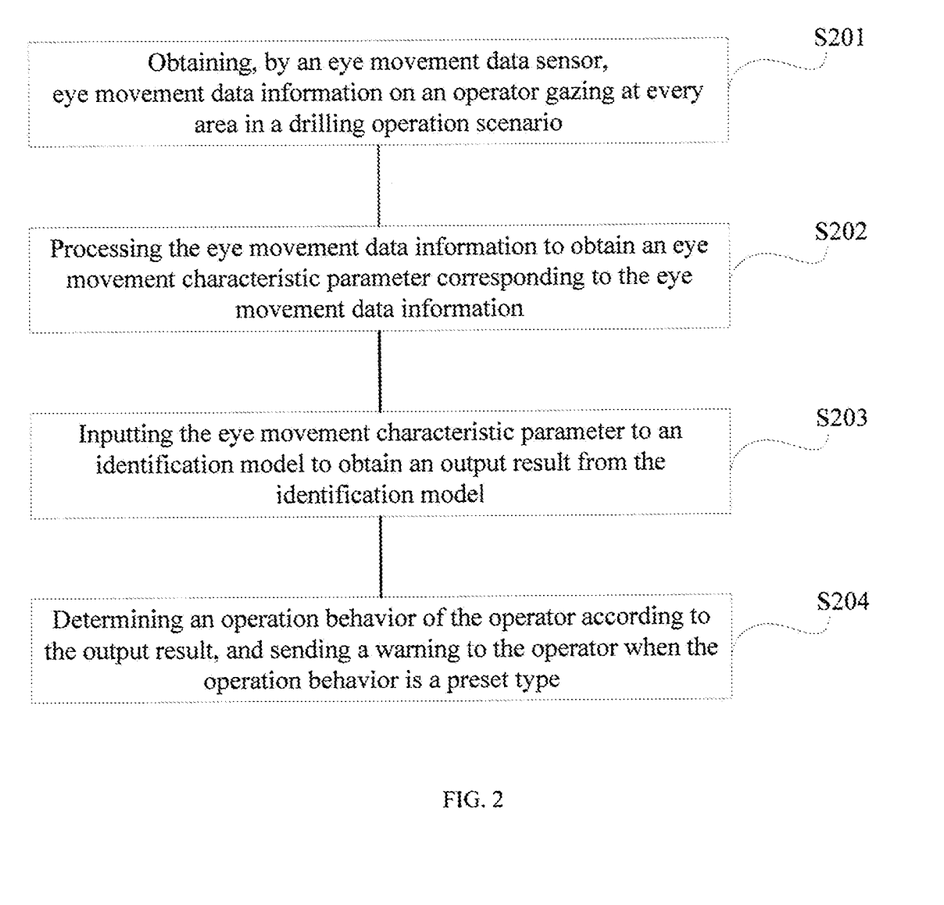
FIG. 2 is a schematic flowchart of a method for identifying an unsafe behavior of a drilling operator according to an embodiment of the present application.

FIG. 2 is a schematic flowchart of a method for identifying an unsafe behavior of a drilling operator according to an embodiment of the present application, and the application of the method to the server of FIG. 1 is illustrated as an example, and the method includes the following steps.

S201, an eye movement data sensor obtains eye movement data information on an operator gazing at every area in a drilling operation scenario.

The eye movement data information is the gaze position, the glance path, the gaze time-length and the like of the eyes of the drilling operator recorded by the eye movement data sensor.

The drilling operation scenario includes a plurality of sensitive areas and non-sensitive areas. The operation scenario as shown in FIG. 1 includes three sensitive areas, and the rest areas are non-sensitive areas.

Figure 3:
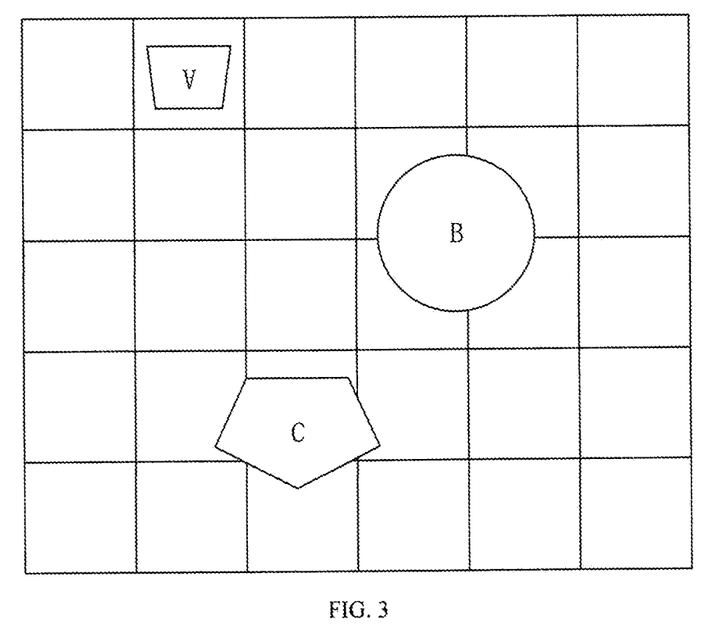
FIG. 3 is a schematic diagram of grid division on sensitive areas according to an embodiment of the present application.

A common method for dividing sensitive areas in an operation scenario is carrying out grid division on the operation scenario, and the units where key equipment is located are all divided into sensitive areas, as shown in FIG. 3. However, due to the fact that there are a large number of important equipment units in the operation scenario of a drilling field, where the important equipment units are irregular in shape for most of them and are quite different in placement position, the grid adaptability is poor (there are many blank spaces in the grid, the grid cannot fully cover, or the number of grids is too large), and it leads to the problem of inaccurate data recording or slow computing speed. Therefore, a method for dividing sensitive areas into irregular shapes is adopted in the embodiments of the present application.

Figure 4:
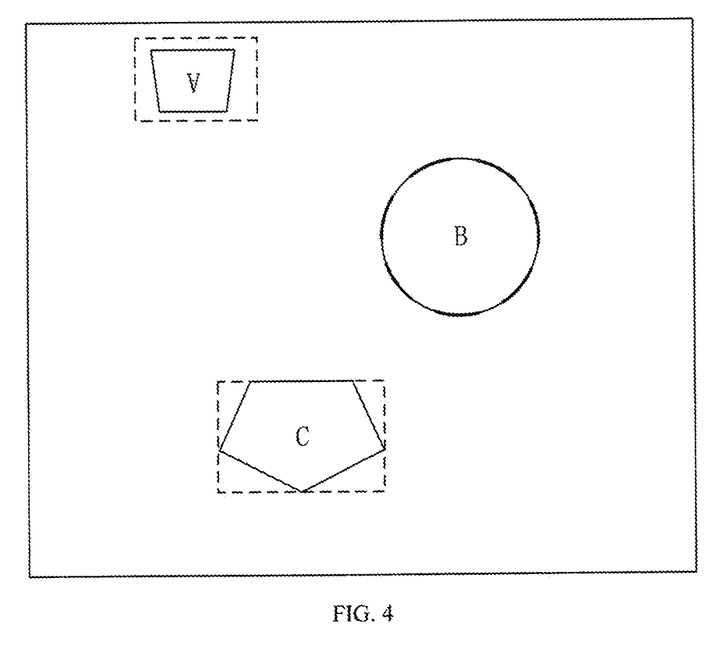
FIG. 4 is a schematic diagram of division on sensitive areas into irregular shapes according to an embodiment of the present application.

As shown in FIG. 4, a method for dividing sensitive areas into irregular shapes is adopted in the embodiments of the present application. According to the function of each of the important units, different ways of dividing sensitive areas can be selected with respect to different types of importance.

Exemplarily, the important unit A is fit to a division way in which important functional areas are at the periphery of the unit and in the unit. The important unit B is fit to a division way in which all the functional areas are located in the unit and are not close to the periphery of the unit. The important unit C is fit to a division way in which functional areas are at the periphery of only a certain surface or certain surfaces of the unit and in the unit.

The server can interact with the eye movement data sensor to obtain the eye movement data information on the operator gazing every area in the scenario.

The interaction between the server and the eye movement data sensor can be conducted once every minute, and can also be set according to actual needs.

S202, processing the eye movement data information to obtain an eye movement characteristic parameter corresponding to the eye movement data information.

The eye movement data information recorded by the eye movement data sensor may be referred to as original eye movement data information. Due to the numerous types thereof, in order to avoid the influence of the original eye movement data information on the accuracy of the identification result, it is necessary to screen out the eye movement data information which is not or less affected by the difference in the number of sensitive areas, and calculate a corresponding eye movement characteristic parameter according to the difference in multiple scenarios and multiple sensitive areas.

S203, inputting the eye movement characteristic parameter to an identification model to obtain an output result from the identification model.

The identification model has been trained in advance and is used for identifying unsafe behaviors of drilling operators according to the obtained eye movement data information.

The server inputs the calculated eye movement characteristic parameter to the identification model, to obtain a corresponding result output from the identification model.

S204, determining an operation behavior of the operator according to the output result, and sending a warning to the operator when the operation behavior is a preset type.

The output result from the identification model may be 0 or 1, the preset type may be an abnormal operation behavior, and the abnormal operation behavior may be referred to as an unsafe operation behavior.

Exemplarily, when the output result from the identification model is 0, the corresponding behavior of the drilling operator is a normal operation behavior, not the preset type, and the server can conduct another data collection.

When the output result from the identification model is 1, the corresponding behavior of the drilling operator is an unsafe operation behavior, which is the same as the preset type. At this time, the server can remind the drilling operator through the wristband worn by the drilling operator, for example, in the manner of vibration reminding or sound reminding, to correct the unsafe behavior of the drilling operator.

In the method mentioned above, the eye movement data information of the drilling operator is collected by the eye movement data sensor and processed to obtain the corresponding eye movement characteristic parameter. The eye movement characteristic parameter is analyzed by the trained identification model to obtain the corresponding analysis result. The drilling operator would be warned according to the analysis result when the behavior of the drilling operator is unsafe. It can be determined whether there is an unsafe operation behavior according to the real-time eye movement data information of the drilling operator. This achieves real-time monitoring and identification of unsafe behaviors conducted by drilling operators.

Figure 5:
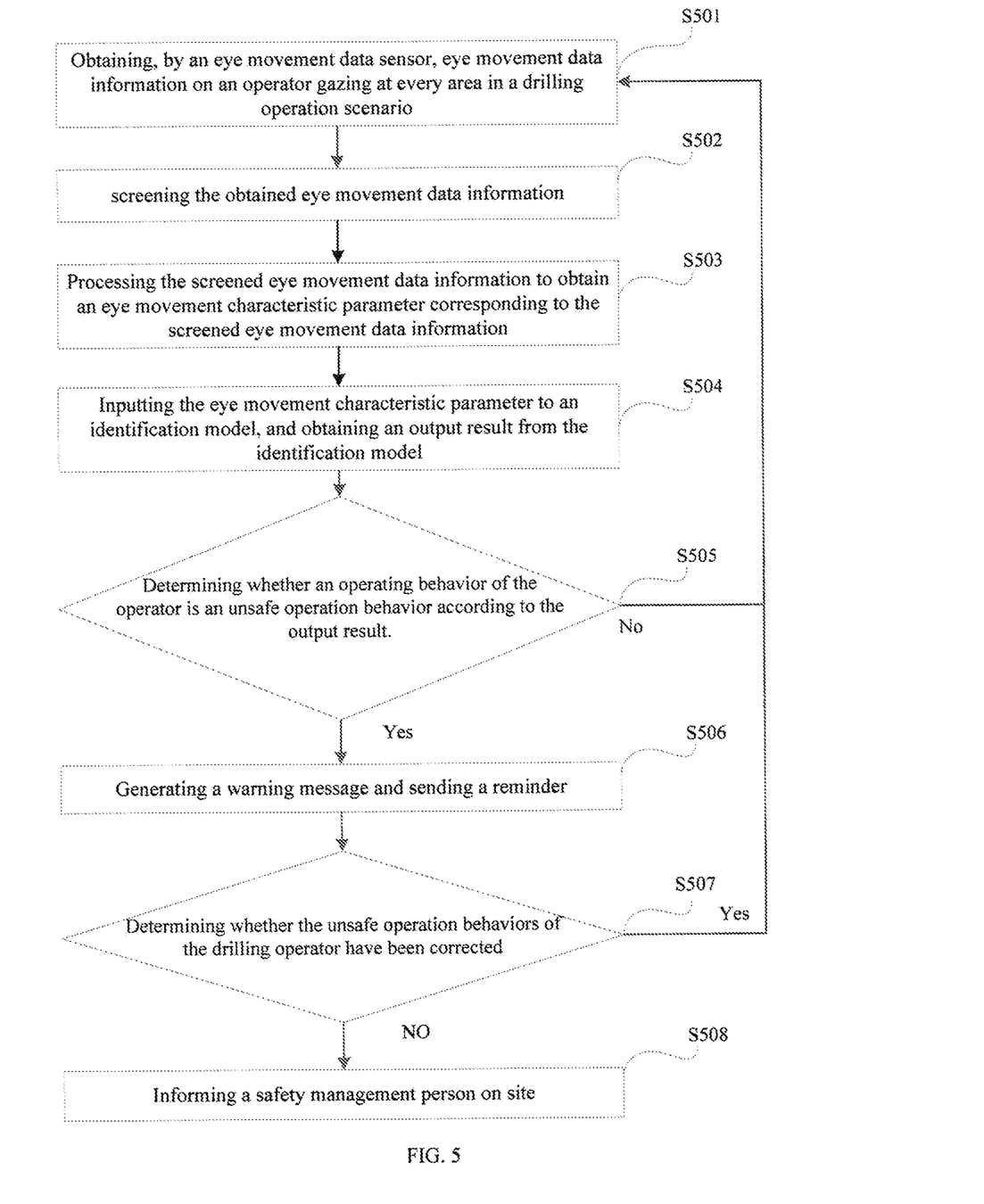
FIG. 5 is a schematic flowchart of a method for identifying an unsafe behavior of a drilling operator according to an embodiment of the present application.

FIG. 5 is a schematic flowchart of the second embodiment of a method for identifying an unsafe behavior of a drilling operator according to the present application, and the method includes the following steps.

S501, an eye movement data sensor obtains eye movement data information on an operator gazing at every area in a drilling operation scenario.

The step S501 in the present embodiment is similar to the step S201 of the embodiment shown in FIG. 2, and details are not described herein again.

In order to realize the identification of unsafe behaviors of drilling operators in different drilling operation scenarios, it is necessary to keep uniform proportion of the sensitive areas accounting for the overall areas in each scenario. In the embodiments of the present application, the proportion of the sensitive areas accounting for the overall areas in each scenario is set as 10%.

The calculation method for the proportion of the sensitive areas accounting for the overall areas in each scenario meets the following formula:

$$P_{S_{sa}} = \frac{S_{sa_1} + S_{sa_2} + \ldots + S_{sa_n}}{S_{os}} = \frac{\sum_{i=1}^{n} S_{sa_i}}{S_{os}} (i = 1, 2, \ldots, n)$$

Where $S_{os}$ area of the image of an entire operation scenario; $S_{sa_1}$, $S_{sa_2}$, . . . , $S_{sa_n}$—area of each sensitive area in the operation scenario; $P_{S_{sa}}$—proportion of sensitive areas accounting for the image of the entire operation scenario.

S502, screening the obtained eye movement data information.

In order to avoid a large number of calculation due to excessive eye movement data and adapt to tasks of identifying unsafe behaviors of drilling operators under different operation scenarios, it is essential to screen the eye movement data of drilling operators collected by the eye movement data sensor, to obtain eye movement date from which operation behaviors of drilling operators can be accurately analyzed.

The screened eye movement data includes the following types:

total number of gaze points, data collection time for single-time eye movement, average gaze time-length, time for the first gaze to one of sensitive areas, time for the second gaze to one of sensitive areas, number of gaze points in sensitive areas, and time-length for gazing at sensitive areas.

The total number of gaze points refers to the total gaze locations by the eyes of a drilling operator within one data collection time. One gaze location represents one gaze point. When the sight of the drilling operator stays at a gaze location exceeding a preset time, the gaze location is a gaze point. The preset time may be 250 milliseconds, and may be set according to actual needs.

The data collection time for single-time eye movement refers to a preset time during which an eye movement sensor collects eye movement data of a drilling operator in the preset time, for example, when 20 seconds is set as the data collection time for single-time eye movement, an eye movement sensor can collect eye movement data of a drilling operator and send the same to a server every 20 seconds periodically.

The average gaze time-length refers to the average time-length for gazing at each gaze point by a drilling operator. The time for the first gaze to one of sensitive areas refers to the time for a drilling operator to gaze at a sensitive area for the first time. The time for the second gaze to one of sensitive areas refers to the time for a drilling operator to gaze at a sensitive area for the second time. The number of gaze points in sensitive areas refers to the number of gaze locations in sensitive areas for a drilling operator within one collection time. The time-length for gazing at sensitive areas refers to the total time-length for a drilling operator to gaze at sensitive areas.

The server screens the eye movement data information of the drilling operator recorded by the eye movement sensor to obtain 7 types of eye movement data information, and then the step of S503 can be executed.

S503, processing the screened eye movement data information to obtain an eye movement characteristic parameter corresponding to the screened eye movement data information.

To eliminate the influence on identifying an unsafe behavior of a drilling operator due to the difference in the quantity of sensitive areas and the difference in the location layout of sensitive areas in different drilling scenarios, it is necessary to calculate the screened eye movement data information to obtain corresponding eye movement characteristic parameters.

The eye movement characteristic parameter includes the following types: sensitive-area gaze-point parameter, sensitive-area gaze time-length parameter, time parameter for the first gaze to sensitive areas, time parameter for the second gaze to sensitive areas, and average gaze time-length parameter.

Specifically, the method of calculating the eye movement characteristic parameter meets the following formula.

Sensitive-area gaze-point parameter:

$$P_{sfp} = \frac{sfp_1 + sfp_2 + \ldots + sfp_n}{fp} = \frac{\sum_{i=1}^{n} sfp_i}{fp} (i = 1, 2, \ldots n)$$

Where $sfp_1, sfp_2, \ldots, sfp_n$—the number of gaze points in each sensitive area in a scenario, $fp$—the total number of gaze points in the scenario, $P_{sfp}$—sensitive-area gaze-point parameter.

Exemplarily, in a certain operation scenario, within the data collection time for single-time eye movement, there are 11 gaze points, where 6 of them fall into the sensitive areas and 5 of them are located outside of the sensitive areas. It can be calculated according to the above formula that the sensitive-area gaze-point parameter is 54.5%.

Sensitive-area gaze time-length parameter:

$$P_{t_{sa}} = \frac{t_{sa_1} + t_{sa_2} + \ldots + t_{sa_n}}{t_{dc}} = \frac{\sum_{i=1}^{n} t_{sa_i}}{t_{dc}} (i = 1, 2, \ldots n)$$

Where $t_{sa_1}, t_{sa_2}, \ldots, t_{sa_n}$—time-length for gazing at each sensitive area in a scenario, $t_{dc}$—data collection time for single-time eye movement, $P_{t_{sa}}$—sensitive-area gaze time-length parameter.

Exemplarily, in a certain operating scenario, within the data collection time for single-time eye movement (20 seconds), the time-length for gazing at sensitive areas is 8960 milliseconds. It can be calculated according to the formula of sensitive-area gaze time-length parameter that the sensitive-area gaze time-length parameter for the drilling operator is 44.8%.

Time parameter for the first gaze to sensitive areas:

$$P_{t_{fsa}} = \frac{\min\{t_{fsa_1}, t_{fsa_2}, \ldots, t_{fsa_n}\}}{t_{dc}} = \frac{t_{fsa_i}}{t_{dc}} (i = 1, 2, \ldots, n)$$

Where $t_{fsa_1}, t_{fsa_2}, \ldots, t_{fsa_n}$—time for the first gaze to each sensitive area in a scenario; $t_{dc}$—data collection time for single-time eye movement; $P_{t_{fsa}}$—time parameter for the first gaze to sensitive areas.

Exemplarily, in a certain operating scenario, within the data collection time for single-time eye movement (20 seconds), the minimum value of time for the first gaze to sensitive areas is 7228 milliseconds. It can be calculated according to the formula of time parameter for the first gaze to sensitive areas that the time parameter for the first gaze to sensitive areas for the drilling operator is 36.1%.

Time parameter for the second gaze to sensitive areas:

$$P_{t_{fsa}} = \frac{\min\{t_{ssa_1}, t_{ssa_2}, \ldots, t_{ssa_n}\}}{t_{dc}} = \frac{t_{ssa_i}}{t_{dc}} (i = 1, 2, \ldots, n)$$

Where $t_{ssa_1}, t_{ssa_2}, \ldots, t_{ssa_n}$—time for the second gaze to each sensitive area in a scenario, $t_{dc}$—data collection time for single-time eye movement, $P_{t_{ssa}}$—time parameter for the second gaze to sensitive areas.

Exemplarily, in a certain operating scenario, within the data collection time for single-time eye movement (20 seconds), the minimum value of time for the second gaze to sensitive areas is 7695 milliseconds. It can be calculated according to the formula of time parameter for the second gaze to sensitive areas that the time parameter for the second gaze to sensitive areas for the drilling operator is 38.5%.

Average gaze time-length parameter:

$$P_{t_{mfd}} = \frac{t_{os_1} + t_{os_2} + \ldots + t_{os_n}}{nt_{dc}} = \frac{\sum_{1}^{n} t_{os_i}}{nt_{dc}} (i = 1, 2, \ldots, n)$$

Where $t_{os_1}, t_{os_2}, \ldots, t_{os_n}$—time-length for gazing at each gaze point in a scenario (including time-length for gazing at each gaze point in a sensitive area); $t_{dc}$—data collection time for single-time eye movement; $P_{t_{mfd}}$—average gaze time-length parameter.

Exemplarily, in a certain operating scenario, within the data collection time for single-time eye movement (20 seconds), the average gaze time-length is 1735.875 milliseconds. It can be calculated according to the formula for the ratio of average gaze time-length that the average gaze time-length parameter $P_{t_{mfd}}$ for the drilling operator is 8.68%.

The server processes the screened eye movement data information to obtain the above 5 types of eye movement characteristic parameters, and then the step of S504 can be executed.

S504, inputting the eye movement characteristic parameter to an identification model to obtain an output result from the identification model.

The identification model is a trained model, the training process of which is shown below.

Various types of training data are obtained.

Figure 6:
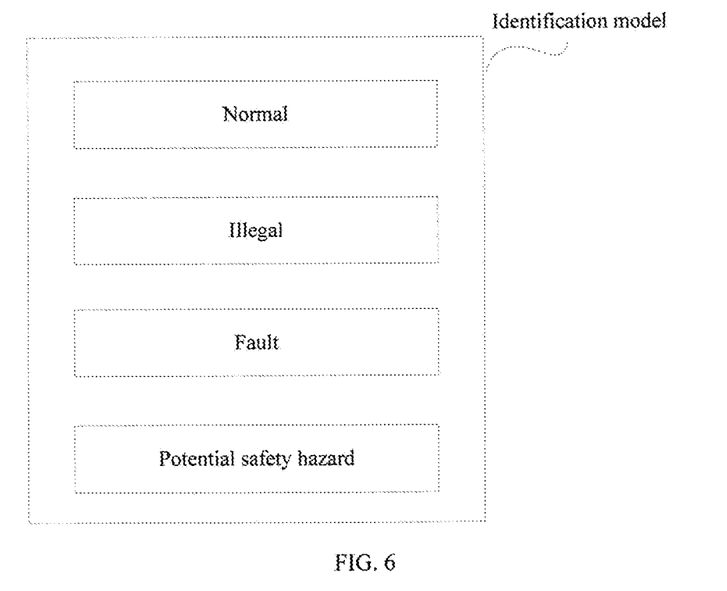
FIG. 6 is a schematic diagram of an identification model according to an embodiment of the present application.

In an embodiment of the present application, XGBoost Model is used as a training object for the identification model, and the identification model includes 4 sub-type models, which specifically, as shown in FIG. 6, can be such 4 sub-type models representing normal, illegal, fault, and potential safety hazard.

The server obtains eye movement characteristic parameters of a drilling operator corresponding to 4 sub-type models and takes the same as training data.

If the training data corresponds to a first sub-type model, the tag value of the first sub-type model is 1, and the tag values for other second sub-type models is 0.

A plurality of sub-type models are trained in the identification model, to obtain a trained identification model.

Exemplarily, when the sub-type model of normal type is trained in the identification model, the obtained eye movement data information which represents a normal operation behavior is processed into a corresponding eye movement characteristic parameter, then the eye movement characteristic parameter is input to 4 sub-type models respectively. The tag value of the sub-type model of normal type is set as 1, and the tag values of other 3 sub-type models are set as 0.

The training method for the other 3 sub-type models is similar to the sub-type model of normal type. After many times of training, a trained identification model is obtained.

The sever processes the obtained real-time eye movement data of a drilling operator into a corresponding eye movement characteristic parameter, the eye movement characteristic parameter is input to the 4 sub-type models of the trained identification model, respectively, to obtain 4 type values output from the identification model.

The value range for each type value is from 0 to 1.

Exemplarily, the corresponding 4 type values obtained after an eye movement characteristic parameter is inputted to the identification model can be as shown in Table 1 below.

Table 1 shows the collected eye movement data information of 4 drilling operators which is processed into corresponding eye movement characteristic parameters, and 4 type values obtained after eye movement characteristic parameters are inputted to the identification model.

| Drilling | Characteristic parameter | | | | | Result of identification model | | | Potential safety |
|---|---|---|---|---|---|---|---|---|---|
| operator | $P_{sfp}$ | $P_{t_{sa}}$ | $P_{t_{fsa}}$ | $P_{t_{ssa}}$ | $P_{t_{mfd}}$ | Normal | Illegal | Fault | hazard |
| 1 | 1.000 | 0.819 | 0.065 | 0.107 | 0.164 | 0.990 | 0.005 | 0.002 | 0.003 |
| 2 | 0.625 | 0.554 | 0.190 | 0.303 | 0.082 | 0.005 | 0.984 | 0.005 | 0.006 |
| 3 | 0.714 | 0.638 | 0.270 | 0.395 | 0.103 | 0.011 | 0.008 | 0.977 | 0.004 |
| 4 | 0.538 | 0.368 | 0.421 | 0.605 | 0.046 | 0.002 | 0.005 | 0.035 | 0.958 |

S505, determining whether an operating behavior of the operator is an unsafe operation behavior according to the output result.

In an embodiment of the present application, unsafe operation behaviors are divided into an illegal behavior, a fault behavior, and a behavior with potential safety hazard.

The illegal behavior is a type of mistake in which the behavior has occurred, and the drilling operator knowingly did. The fault behavior is a type of mistake in which the behavior has occurred, but the operator is unconscious of it. The behavior with potential safety hazard is an unsafe operation behavior such as fatigue, nervousness, an inexperienced operation, and the like, after which an illegal behavior or a fault behavior may occur.

The sever obtains 4 type values output from the identification model, then obtains the maximum type value among the 4 type values, and determines a type corresponding to the maximum type value as the operation behavior of the operator.

Exemplarily, 4 type values output from the identification model and obtained by the server each are the type value 0.05 output from the sub-type model representing a normal behavior, the type value 0.984 output from the sub-type model representing an illegal behavior, the type value 0.005 output from the sub-type model representing a fault behavior, and the type value 0.006 output from the sub-type model representing a behavior with potential safety hazard, among which the maximum type value is 0.984 output from the sub-type model representing illegal. Therefore, the corresponding operation behavior is an illegal behavior.

If the operation behavior is not unsafe, the step of S501 is executed.

If the operation behavior is unsafe, the step of S506 is executed.

S506, generating a warning message and sending a reminder.

The warning message may be a text message, which is used to record the type of the abnormal operation behavior of the drilling operator within a period of time and can be stored in the server.

Exemplarily, when the server determines that the operation behavior of a drilling operator A is an illegal behavior, "A made an illegal behavior on xx/xx/xx (month/day/year)" would be recorded in the server background.

Meanwhile, the server can warn the drilling operator by the wristband worn by the drilling operator, for example, in the manner of sending a vibration reminder or a voice reminder, to correct the unsafe behavior of the drilling operator.

After practical tests, in the embodiments of the present application, the accuracy of identifying an unsafe behavior of a drilling operator can reach 100%, which can meet the engineering demand on unsafe behaviors in drilling operation.

The importance level of characteristic parameters for eye movement data provided by the embodiments of the present application is shown in Table 2:

| | Characteristic parameters | | | | |
|---|---|---|---|---|---|
| | $P_{sfp}$ | $P_{t_{sa}}$ | $P_{t_{fsa}}$ | $P_{t_{ssa}}$ | $P_{t_{mfd}}$ |
| Importance level | 0.076207 | 0.203625 | 0.263599 | 0.070728 | 0.385841 |

It can be seen from Table 2 that 5 kinds of characteristic parameters for eye movement data provided by the embodiments of the present application all play an important role in identifying an unsafe behavior of a drilling operation, where the importance level of the average gaze time-length parameter and the time parameter for the first gaze to sensitive areas are highest, while the importance level of the sensitive-area gaze-point parameter and the time parameter for the second gaze to sensitive areas is relatively low. This indicates that the location of a sensitive area, level of concentration, eye habits of different operators, and the position of the gaze point at the end of the previous eye movement data collection have a great impact on identifying unsafe behaviors. However, seeing from the values, the proposed identification solution has a generalization effect on identifying unsafe operation behaviors in multiple scenarios.

S507, determining whether the unsafe operation behavior of the drilling operator has been corrected.

The sever determines whether an operation behavior of an operator is a normal operation behavior according to eye movement data information of the drilling operator collected in the next period of time.

If the operation behavior is normal, it means that the abnormal operation behavior of the operator has been corrected. Then the step of S501 can be executed.

If the unsafe operation behavior still remains, the step of S508 may be executed.

S508, informing a safety management person on site.

The unsafe operation behavior of the drilling operator is corrected by informing the safety management person on site.

In the above method, eye movement data information of a drilling operator is collected by an eye movement data sensor and is processed into a corresponding eye movement characteristic parameter, and the eye movement characteristic parameter is input to a trained identification model to obtain multiple type values output by the identification model. The operation behavior is determined according to the maximum type value. When the operation behavior is one of the abnormal behaviors, the drilling operator is warned to correct the abnormal operation behavior. This realizes all-weather monitoring and identification of unsafe operation behaviors of a drilling operator, overcomes the defects of traditional methods which have monitoring dead spots and monitoring missing, improves the insufficient generalization ability of a model through calculating a corresponding eye movement characteristic parameter, and achieves the identification of unsafe behaviors of a drilling operator in multiple scenarios.

Figure 7:
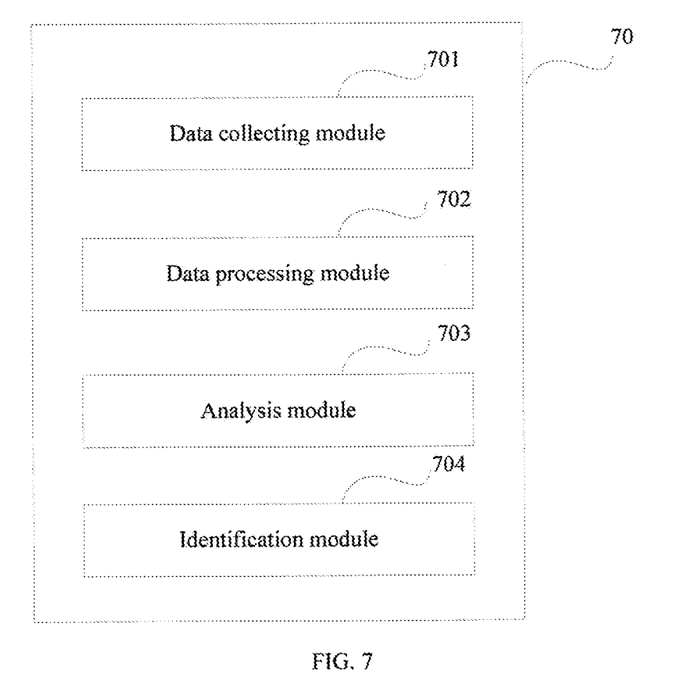
FIG. 7 is a schematic diagram of a device for identifying an unsafe behavior of a drilling operator according to an embodiment of the present application.

As shown in FIG. 7, an embodiment of the present application further provide a device 70 for identifying an unsafe behavior of a drilling operator, including a data collecting module 701, a data processing module 702, an analysis module 703, and a warning module 704.

The data collecting module 701 is configured to collect eye movement data of the drilling operator in an operation scenario.

The data processing module 702 is configured to screen and process the eye movement data information of the drilling operator to obtain an eye movement characteristic parameter, where the eye movement characteristic parameter includes a sensitive-area gaze-point parameter, a sensitive-area gaze time-length parameter, a time parameter for the first gaze to sensitive areas, a time parameter for the second gaze to sensitive areas, and an average gaze time-length parameter.

The analysis module 703 is configured to analyze the eye movement characteristic parameter to obtain an analysis result.

Specifically, the eye movement characteristic parameter is input to an identification model by the analysis module 703 to obtain an output result from the identification model.

The warning module 704 is configured to determine an operation behavior of the drilling operator according to the analysis result, and send a warning to the operator when the operation behavior is a preset type.

The device for identifying an unsafe behavior of a drilling operator provided by the embodiment can execute the technical solution of the method embodiment shown in FIG. 2, the implementation principle and technical effect thereof are similar, the details of which are not described herein again.

Further, an embodiment of the present application also provides a device for identifying an unsafe behavior of a drilling operator. Based on the device 70 for identifying an unsafe behavior of a drilling operator provided in the embodiment shown in FIG. 7, it further includes a model training module 705.

The data processing module 702 is also configured to screen out the following 7 types of eye movement data information according to the collected eye movement data information:

total number of gaze points, data collection time for single-time eye movement, average gaze time-length, time for the first gaze to one of sensitive areas, time for the second gaze to one of sensitive areas, number of gaze points in sensitive areas, and time-length for gazing at sensitive areas.

The analysis module 703 is also configured to obtain a plurality of type values according to the eye movement characteristic parameter.

Specifically, the eye movement characteristic parameter is inputted to the identification model to obtain type values corresponding to 4 sub-type models in the identification model and to obtain the maximum type value among the 4 type values, where the range of each type value is from 0 to 1.

The identification module 704 is also configured to determine a type corresponding to the maximum type value as the operation behavior of the operator.

The model training module 705 is configured to train the identification model.

Specifically, various types of training data are obtained.

When the training data corresponds to the first sub-type model, the tag value of the first sub-type model is 1 and the tag values of other second sub-type models are 0.

A plurality of sub-type models in the identification model is trained to obtain a trained identification model.

The device for identifying an unsafe behavior of a drilling operator provided by the embodiment of the present application can execute the technical solution of the method in the embodiment shown in FIG. 5, and the implementation principle and the technical effect thereof are similar, the details of which are not described herein again.

Figure 8:
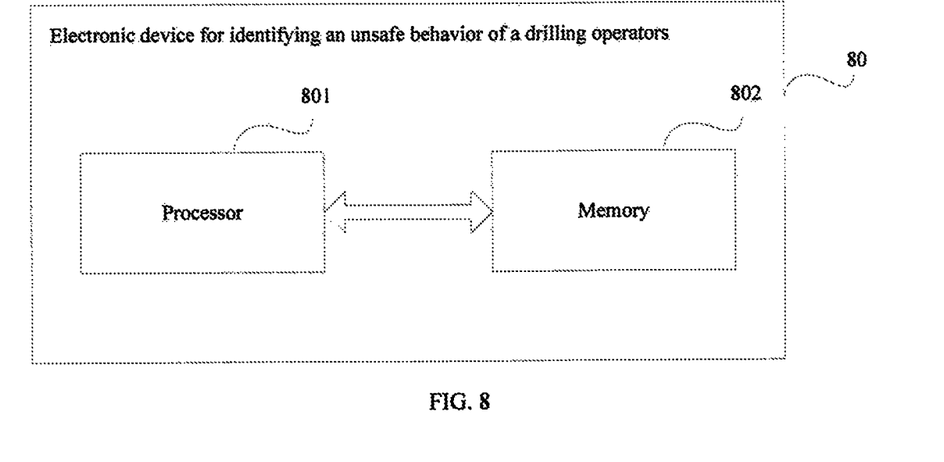
FIG. 8 is a schematic structural diagram of an electronic device according to an embodiment of the present application.

FIG. 8 is a schematic structural diagram of an electronic device according to an embodiment of the present application. As shown in FIG. 8, a device 80 provided in the present embodiment may include:

a processor 801; and
a memory 802 configured to store an executable instruction for an electronic device.

The processor is configured to execute the above technical solutions of embodiments of a method for identifying an unsafe behavior of a drilling operator by executing an executable instruction, and the implementation principle and the technical effect thereof are similar, the details of which are not described herein again.

An embodiment of the present application further provides a computer readable storage medium which stores a computer program. When the computer program is executed by a processor, the above technical solutions of embodiments of a method for identifying an unsafe behavior of a drilling operator are realized, and the implementation principle and the technical effect thereof are similar, the details of which are not described herein again.

In a possible implementation, the computer readable medium may include a random access memory (RAM, Random Access Memory), a read-only memory (ROM, Read-Only Memory), a compact disc read-only memory (CD-ROM, Compact Disc Read-Only Memory) or other optical disk memories, a magnetic disk storage or other magnetic storage devices, or any other mediums that are targeted for carrying data, or store the required program codes in the form of instructions or data structures and accessible to a computer. Also, any connection is properly termed a computer-readable medium. For example, if a coaxial cable, a fiber optic cable, a twisted pair, a digital subscriber line (DSL, Digital Subscriber Line) or a wireless technology (such as infrared rays, radio waves and microwaves) is used to transmit a software from a website, a server, or other remote sources, the coaxial cable, fiber optic cable, twisted pair, DSL, or wireless technology such as infrared rays, radio waves, and microwaves are also included in the definition of the medium. Disks and discs, as used herein, include compact disc, laser disc, optical disc, digital versatile disc (DVD, Digital Versatile Disc), floppy disk and Blu-ray disc, where disks usually magnetically reproduce data, while discs optically reproduce data with lasers. Combinations of the above should also be included within the scope of the computer readable media.

An embodiment of the present application further provides a computer program product, which includes a computer program. When the computer program is executed by a processor, the technical solutions of embodiments of a method for identifying an unsafe behavior of a drilling operator are realized, and the implementation principle and the technical effect thereof are similar, the details of which are not described herein again.

In a specific implementation of the above terminal device or the server, it should be understood that the processor may be a central processing unit (CPU, Central Processing Unit), or may be another general-purpose processor, a digital signal processor (DSP, Digital Signal Processor), an application specific integrated circuit (ASIC, Application Specific Integrated Circuit), etc. The general-purpose processor may be a microprocessor or the processor may be any conventional processor or the like. The steps of the method disclosed in the embodiments of the present application may be directly executed by a hardware processor, or are executed by using a combination of hardware and software modules in a processor.

Persons of ordinary skill in the art may understand that all or part of the steps in any one of the above method embodiments may be implemented by hardware related to program instructions. The programs described above can be stored in a computer readable storage medium, and when the program is executed, all or part of the steps of the methods according to the embodiments is executed.

The technical solutions of the present application can be stored in a computer readable storage medium if the technical solutions are implemented in the form of software and sold or used as products. Based on this understanding, all or part of the technical solutions of the present application may be embodied in the form of a software product, and the computer software product is stored in a storage medium and includes a computer program or several instructions. The computer software product enables a computer device (which may be a personal computer, a server, a network device, or similar electronic devices) to execute all or part of the steps of the methods according to the embodiments of the present application.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments, or make equivalent substitutions to some or all of the technical features. These modifications or substitutions do not depart from the scope of the technical solutions of the embodiments of the present application.

What is claimed is:

1. A method for identifying an unsafe behavior of a drilling operator, wherein the method is applied to a drilling site, and the method comprises:
   obtaining, by an eye movement data sensor, eye movement data information on the operator gazing at every area in a drilling operation scenario, wherein the operation scenario comprises a plurality of sensitive areas and non-sensitive areas;
   processing the eye movement data information to obtain an eye movement characteristic parameter corresponding to the eye movement data information, and the eye movement characteristic parameter comprises a sensitive-area gaze-point parameter, a sensitive-area gaze time-length parameter, a time parameter for the first gaze to the sensitive areas, a time parameter for the second gaze to the sensitive areas, and an average gaze time-length parameter;
   inputting the eye movement characteristic parameter to an identification model to obtain an output result from the identification model; and
   determining an operation behavior of the operator according to the output result, and sending a warning to the operator when the operation behavior is a preset type;
   wherein the inputting the eye movement characteristic parameter to the identification model to obtain the output result from the identification model comprises:
   inputting the eye movement characteristic parameter to the identification model to obtain a plurality of type values, wherein the identification model comprises a plurality of sub-type models, and each of the sub-type models outputs one type value; and
   the determining the operation behavior of the operator according to the output result comprises:
   determining the operation behavior of the operator according to the plurality of type values.

2. The method according to the claim 1, wherein the eye movement data information comprises:
   total number of gaze points, data collection time for single-time eye movement, average gaze time-length, time for the first gaze to one of the sensitive areas, time for the second gaze to one of the sensitive areas, number of gaze points in the sensitive areas, and time-length for gazing at the sensitive areas.

3. The method according to the claim 1, wherein the processing the eye movement data information to obtain the eye movement characteristic parameter corresponding to the eye movement data information comprises:
   obtaining the sensitive-area gaze-point parameter according to a ratio of a sum of the number of gaze points in each of the sensitive areas in the operation scenario to a total number of gaze points in the operation scenario;
   obtaining the sensitive-area gaze time-length parameter according to a ratio of a sum of time-length for gazing at each of the sensitive areas in the operation scenario to data collection time for single-time eye movement;
   obtaining the time parameter for the first gaze to sensitive areas according to a ratio of the minimum value among time values for the first gaze to each of the sensitive areas in the operation scenario to the data collection time for single-time eye movement;
   obtaining the time parameter for the second gaze to the sensitive areas according to a ratio of the minimum value among time values for the second gaze to each of the sensitive areas in the operation scenario to the data collection time for single-time eye movement; and
   determining the average gaze time-length parameter according to a ratio of a sum of time-length for gazing at each of N gaze points in the operation scenario to N times of the data collection time for single-time eye movement.

4. The method according to claim 1, wherein the determining the operation behavior of the operator according to the plurality of type values comprises:
   obtaining the maximum value among the plurality of type values, wherein the type values are in a range of 0 to 1; and determining a type corresponding to the maximum type value as the operation behavior of the operator.

5. The method according to claim 1, wherein the method further comprises:
   obtaining different types of training data;
   when the training data corresponds to a first sub-type model, a tag value for the first sub-type model is 1, and tag values for other second sub-type models are 0; and training the plurality of sub-type models in the identification model to obtain a trained identification model.

6. The method according to claim 1, wherein the operation behavior is one of a normal behavior, an illegal behavior, a faulty behavior, a behavior with potential safety hazard.

7. The method according to claim 4, wherein the operation behavior is one of a normal behavior, an illegal behavior, a faulty behavior, a behavior with potential safety hazard.

8. The method according to claim 5, wherein the operation behavior is one of a normal behavior, an illegal behavior, a faulty behavior, a behavior with potential safety hazard.

9. A non-transitory computer readable storage medium, wherein the computer readable storage medium store a computer program, the computer program is executed by a processor to implement the method according to claim 1.

10. The non-transitory computer readable storage medium according to claim 9, wherein the eye movement data information comprises:
total number of gaze points, data collection time for single-time eye movement, average gaze time-length, time for the first gaze to one of the sensitive areas, time for the second gaze to one of the sensitive areas, number of gaze points in the sensitive areas, and time-length for gazing at the sensitive areas.

11. The non-transitory computer readable storage medium according to claim 9, wherein the processing the eye movement data information to obtain the eye movement characteristic parameter corresponding to the eye movement data information comprises:
obtaining the sensitive-area gaze-point parameter according to a ratio of a sum of the number of gaze points in each of the sensitive areas in the operation scenario to a total number of gaze points in the operation scenario;
obtaining the sensitive-area gaze time-length parameter according to a ratio of a sum of time-length for gazing at each of the sensitive areas in the operation scenario to data collection time for single-time eye movement;
obtaining the time parameter for the first gaze to sensitive areas according to a ratio of the minimum value among time values for the first gaze to each of the sensitive areas in the operation scenario to the data collection time for single-time eye movement;
obtaining the time parameter for the second gaze to the sensitive areas according to a ratio of the minimum value among time values for the second gaze to each of the sensitive areas in the operation scenario to the data collection time for single-time eye movement; and
determining the average gaze time-length parameter according to a ratio of a sum of time-length for gazing at each of N gaze points in the operation scenario to N times of the data collection time for single-time eye movement.

12. The non-transitory computer readable storage medium according to claim 9, wherein the determining the operation behavior of the operator according to the plurality of type values comprises:
obtaining the maximum value among the plurality of type values, wherein the type values are in a range of 0 to 1; and
determining a type corresponding to the maximum type value as the operation behavior of the operator.

13. The non-transitory computer readable storage medium according to claim 9, wherein the method further comprises:
obtaining different types of training data;
when the training data corresponds to a first sub-type model, a tag value for the first sub-type model is 1, and tag values for other second sub-type models are 0; and
training the plurality of sub-type models in the identification model to obtain a trained identification model.

14. The non-transitory computer readable storage medium according to claim 9, wherein the operation behavior is one of a normal behavior, an illegal behavior, a faulty behavior, a behavior with potential safety hazard.

15. A device for identifying an unsafe behavior of a drilling operator, comprising:
a memory, a processor connected to the memory, and a computer program stored on the memory and runnable on the processor, wherein the computer program, when executed by the processor, causes the processor to:
collect eye movement data information of the drilling operator in an operation scenario;
screen and process the eye movement data information of the operator to obtain an eye movement characteristic parameter;
analyze the eye movement characteristic parameter to obtain an analysis result; and
determine an operation behavior of the operator according to the analysis result, and send a warning to the operator when the operation behavior is a preset type;
wherein the computer program, when executed by the processor, causes the processor to: input the eye movement characteristic parameter to an identification model to obtain a plurality of type values, and determine the operation behavior of the operator according to the plurality of type values; wherein the identification model comprises a plurality of sub-type models, and each of the sub-type models outputs one type value.

* * * * *